United States Patent

[11] 3,540,650

[72] Inventors Willem Antonius Boekelman, Sr.;
 Willem Antonius Boekelman, Jr., Venlo,
 Netherlands
[21] Appl. No. 817,597
[22] Filed Jan. 30, 1969
 A division of Ser. No. 716,153,
 Mar. 26, 1968, pending.
[45] Patented Nov. 17, 1970
[73] Assignee N. V. Metaalwarenfabriek "Venlo,"
 Venlo, Netherlands

[54] THERMOSTATIC REGULATING DEVICE WITH A SYNTHETIC THERMOPLASTIC EXPANSION ELEMENT
 3 Claims, 2 Drawing Figs.
[52] U.S. Cl. ............................................... 236/12,
 236/93, 73/363
[51] Int. Cl. ........................................ G01k 5/48,
 G05d 23/13

[50] Field of Search ........................................ 236/12,
 103, 93; 73/363; 60/23

[56] References Cited
 UNITED STATES PATENTS
 2,525,511 10/1950 Arnold .......................... 236/12
 2,792,180 5/1957 Flagg ............................ 236/93
 3,366,328 1/1968 Feinberg ....................... 236/12

Primary Examiner—William E. Wayner
Attorney—Sughrue, Rothwell, Mion, Zinn & MacPeak ABSTRACT: A thermostatic regulating device utilizes an expansion element of thermoplastic synthetic material with a thermal coefficient of expansion of at least $1 \times 10^{-4}$ mm./°C such as polypropylene or polyethylene in an elongated shape with a thickness over at least a part of its length of not more than 2 mm. The expansion element may be used in a combination hot and cold fluid tap with one end of the element connected to a valve member and the other end adjustably connected to the housing.

Patented Nov. 17, 1970
3,540,650
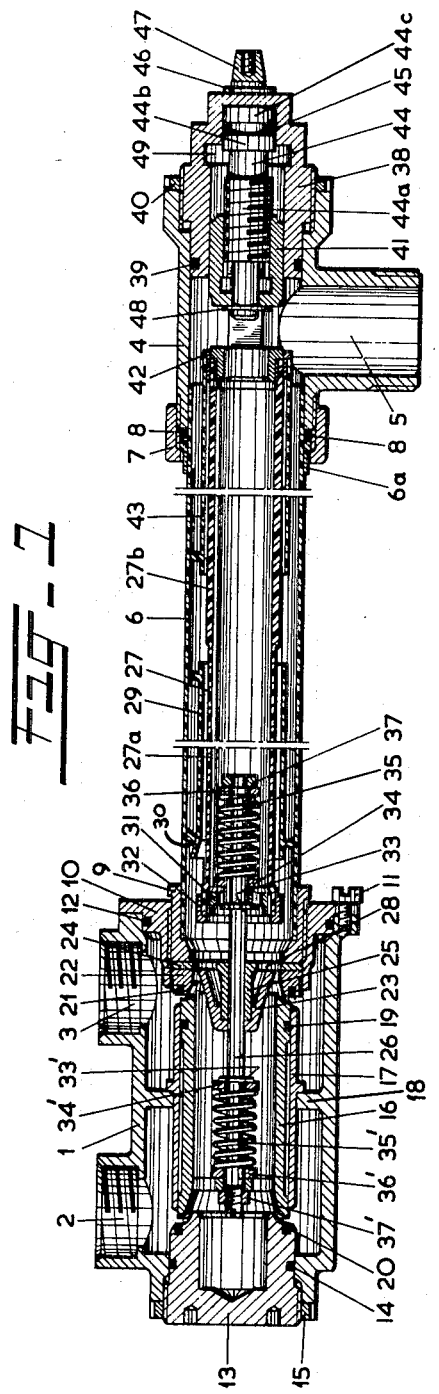

3,540,650

THERMOSTATIC REGULATING DEVICE WITH A SYNTHETIC THERMOPLASTIC EXPANSION ELEMENT

CROSS REFERENCES TO RELATED APPLICATIONS

This application is a divisional of U.S. Pat. application Ser. No. 716,153.

BACKGROUND OF THE INVENTION

1. Field of the Invention

The invention relates to an expansion element intended for operating a thermostatic regulating member for one or more fluid or gaseous media.

2. Prior Art

Thermostatic regulating devices including thermal expansion elements are known and used for regulation of fluid temperature. Such expansion elements keep the temperature of a medium constant as much as possible. Typical examples are the maintenance of the coolant temperature of an engine or the like, or a radiator thermostat for a central heating system. Another range of applications is that of combination taps for domestic water systems used on bathtubs, showers, and the like. The purpose of the expansion element in this case is to regulate the mixing ratio between the hot and the cold water in such a way that the mixture obtained maintains a constant temperature as much as possible, even when the temperature of the hot or cold water changes, e.g. through variations in pressure.

The expansion element may, for instance, be formed by a box with a diaphragm, by a flexible box, or by bellows filled with a temperature sensitive fluid. Such an expansion element presents the advantage that large forces can be exerted, while the expansion and the contraction respectively are readily reproducible. However, since the diaphragm, the wall of the box, or the bellows must have a small wall thickness, the useful life is very short, especially when the element is placed, for instance, in calcareous water or corrosive or abrasive media.

The expansion element may also be formed by a bimetal. A bimetal, however, entails the disadvantage that only a small force is generated at expansion, so that an expansion element consisting of a bimetal as a rule can only be used for indirectly controlled regulating members, such as electric switches.

From the Netherlands Pat. specification No. 90,132, however, a regulating device is known in which the regulating member, in this case the regulating slide, is directly controlled by a column of stacked dish-shaped bimetals. The bimetallic column is mounted inside a sleeve.

By the stacking of a number of bimetals a sufficiently large adjusting force can indeed be generated, but the resultant construction is expensive. Further, there is considerable risk that the bimetals will jam in the enveloping sleeve. The medium surrounding the sleeve can enter the sleeve, and as a consequence there is a tendency for corrosion and fouling of the bimetals and the jamming is promoted even further. Thus, the operation of the column can be affected in such a way that correct regulation cannot be accomplished.

Bimetals present the additional disadvantage that through fatigue phenomena and internal stresses serious deviations from their original scale tend to occur in course of time.

SUMMARY OF THE INVENTION

All these disadvantages in a thermostatic regulating device are avoided according to this invention because the expansion element consists of a thermoplastic synthetic material with an expansion coefficient of at least $1 \times 10^{-4}$ mm./°C., such as polypropylene or polyethylene, while over at least a part of its length the wall thickness does not exceed 2 mm.

With such an expansion element, forces in the order of magnitude of 0—10 kg. can be exerted. It can be used in a range of temperature from 0 to 100°C., and it brings about a correction up to ± 1° of the adjusted temperature in the medium, in particular a liquid within 3—10 seconds.

The striking discovery has been made that an expansion element of synthetic material with the above features is able to regulate flows in gaseous or liquid media thermostatically in a very accurate way.

The element may have different cross-sectional forms, provided the wall thickness over at least a part of the length does not exceed 2 mm. If the wall thickness chosen is greater, for most applications the inertia is too great. The element should be mounted and constructed in such a way that it is washed, at least partly, and preferably as much as possible by the surrounding medium.

It has been found that the reproducibility of the expansion and contraction with the wall thickness used is greatly increased by a thermal pretreatment, by means of which the internal stresses in the synthetic material are neutralized as far as possible. For an expansion element of the type employed, a prolonged treatment in boiling water is sufficient.

An expansion element of this kind can be used in a fluid medium for indirect as well as direct control. In the former case, all the advantages as compared with bimetal are enjoyed, while the desired displacement need only be small, so that the length of the expansion element is small. In the latter case, it is possible to exert large forces upon the regulating member, dependent upon the area of the member, while the length chosen will determine the correction possibility.

In the construction of the expansion element, the choice of the form of the element is completely free in order to obtain a sufficient cross-sectional area.

At least in part, however, the walls of the regulating member which are washed by the medium must not be thicker than 2 mm. The member may have the form of a hollow tube with a rectangular or a circular cross section. The member may also be composed of a number of strips intersecting each other so as to form a star. By this means, a larger area of contact is obtained.

When the expansion element is used in a combination tap faucet or for controlling industrial installations with a regulating member which is adjusted directly by the expansion element, at use in a ¾" to 1" installation the expansion of the element will have to be, for instance, ± 12 mm./100°C. in order to obtain a 4—6-fold correction of the temperature deviation. For direct control, the length of the expansion element is then determined at 800—1,000 mm.

Under some circumstances, such as low use of water, the temperature is found to always have great fluctuations. This can be prevented by coupling in the expansion element a fast-reacting part with a slow-reacting part, in consequence of which the temperature after only two observable fluctuations about the adjusted temperature reaches the latter to an accuracy of within 1°C. within 3—20 seconds. The correct operation can be achieved, for instance, by making the quotient of volume by area per unit length over a given length smaller than over the rest of the length, or by insulating part of the length, e.g. by means of a stationary water column, or by giving this part a greater wall thickness.

Another great advantage of the expansion element according to the invention is that the reciprocating movement proceeds without spring load by expansion and contraction of the element itself.

A slide for directly or indirectly controlled regulating members can be attached simply to the expansion element.

If a valve-shaped regulating member is to be controlled, the cross section of the expansion element can always be chosen in such a way that it can overcome the desired forces without any damage in the form of permanent deformation, while still the maximum wall thickness of 2 mm. over at least a part of the length is not exceeded.

When the required size of the expansion element is too long for the environmental application, it can be reduced to smaller proportions by telescoping separately coupled sections.

BRIEF DESCRIPTION OF THE DRAWING

In the drawing:

FIG. 1, by way of example shows a longitudinal section of a regulating device for mixing two fluid media, in which use is made of an expansion element of thermoplastic synthetic material.

FIG. 2 shows a number of examples of possible forms of cross section of the expansion element.

DESCRIPTION OF THE PREFERRED EMBODIMENTS

The regulating device of FIG. 1 which can be used for example as a combination thermostatic valve for a shower or bath, comprises a substantially cylindrical housing 1 with two inlet or supply connections 2 and 3 for the hot and for the cold water respectively, and a substantially T-shaped housing 4 with a discharge outlet 5 for the mixture. The two housings are relatively large distances apart, which distance is bridged by an outer tube 6, which has fluid-tight connections with the two housings. The connection with the housing 4 is formed by a sleeve 6a soldered to the tube 6 with nut 7 screwed thereon and a rubber O-ring 8. Near the housing 1, the end of the outer tube 6 is surrounded in a fluid-tight manner by a member 9 provided with outer thread and screwed into a flanged bushing 10, which closes the housing 1 at one end with the aid of bolts 11. Located between the housing 1 and this flanged bushing 10 is another O-ring seal 12.

The other end of housing 1 is closed by a seating sleeve 13 screwed therein, another O-ring 14 is serving to seal it. A nut 15 locks the seating sleeve 13. This seating sleeve 13 is adjustable in relation to the housing 1.

Mounted inside the housing 1 is a tubular double-acting valve 16, which is movably guided by a guide sleeve 17 connected with a radial flange 18 in the housing 1.

Between the double-acting valve 16 and the guide sleeve 17 there is an O-ring 19.

The valve seat for the passage via the hot water inlet 2 is formed by a seating ring 20 fitted in the seating sleeve 13. The left end of the tubular double-acting valve 16 cooperates with this seating ring 20. By adjustment of the seating sleeve 13, the size of the passage is varied.

The valve seat for the cold water, which enters via the inlet 3, is formed by a seating ring 21, which cooperates with the right end of the double-acting valve 16. This seating ring 21 is fitted in a seating ring member 22, which is integral with a mixing cone 23. This seating ring member 22 is forced by the member 9 against an inwardly directed edge at the end of the flanged bushing 10. Located between the member 22 and the member 9 is another mixing ring 24, which is integral with a sleeve 25 inside the mixing cone 23. Guided by this sleeve 25 is a valve rod 26, which connects the double-acting valve 16 with expansion element 27 of thermoplastic synthetic material having an expansion coefficient in the order of magnitude of $1 \times 10^{-4}$ mm./°c., such as polyethylene or polypropylene.

Between the mixing ring 24 and the sleeve 25, openings 28 are present through which a mixture of cold and hot water enters the space inside the outer tube 6 in order to wash the expansion element 27 on the inside and the outside.

In the example shown in FIG. 1, the expansion element 27 consists of a hollow cylindrical tube with a wall thickness which over the foremost one-third of the length does not exceed 2 mm. The part with a smaller wall thickness 27a is upstream, in order that any disturbance that should occur may be suppressed as quickly as possible, because otherwise, the whole space in which the expansion element is present is supplied for too long a time with water of the wrong temperature, which, considering the correction factor, would amount to an overcompensation of the error. The part 27b located downstream may be thicker or may be insulated to decrease the short term effect of the quantity of water of the wrong temperature. This quantity of water can thus leave the element without exercising a strong influence. A prolonged disturbance, however, will also be compensated in part by the slow acting part. The part 27a of the element 27 directed towards the double-acting valve 16 has a wall thickness of about 1 mm. and the right part 27b has a wall thickness of about 2 mm. In this way, the desired difference in expansion rate of the two parts is obtained. The area washed by the water is approximately equal for the two parts per unit length, but the area of the cross section of the material varies, so that the quotient of these two values is different for the two parts.

The element 27 is surrounded over a considerable part of its length by a tube 29, which has been fitted at some distance inside the outer tube 6. A guiding ring 30 of flexible material ensures that when small quantities flow through, the water largely flows along the expansion element. When large quantities pass the guiding ring will be deflected, in consequence of which a portion of the water will flow on the outside along the inner sleeve 29. The ring may also be replaced by a bush.

The connection between the left end of the expansion element 27 and the valve rod 26 is spring loaded in one direction and is formed by a screw member 31 fixed on the end of the element 27, said screw member clamping this end against a clamping ring 32. Located in a groove in the valve rod 26 is a locking ring 33, which is adapted to abut against the member 31. Resting against the other end of the member 31 is a spring cup 34, against which a compression spring 35 is resting. The right end of the valve rod 26 is also provided with a spring cup 36 which is retained by a nut 37 screwed on the valve rod.

The connection between the valve rod 26 and the double-acting valve 16 is designed in a similar way and is denoted by similar reference numerals with accent marks or primes.

Due to these spring loaded connections, upon expansion of the expansion element, the valve rod will at once be taken along, and accordingly, so will the double-acting valve, until the left end of the double-acting valve comes to rest on the seat, after which the spring 35' is compressed to prevent overloading of the expansion element 27. For contraction of the element, this applies in the reverse direction.

Screwed adjustably into the right of the housing 4 is a member 38 which closes the end of this housing and in which the adjusting mechanism for the desired water temperature is accommodated. An O-ring 39 provides for the sealing and a nut 40 for the locking.

Accommodated in the member 38 is a slide 41, which is connected with the right end of the expansion element 27. This right end is engaged by a clamping sleeve 42, which clamps the right end of the expansion element 27 against the slide 41. The clamping sleeve 42 is further provided with an elongated sleeve 43, which surrounds the first part of the element 27, so that a more or less stationary water column is formed, which insulates this part to some extent.

Cooperating with the slide 41 is a spindle 44, which includes a threaded thickened portion 44a, which cooperates with an internal screw thread in the slide 41. Two collars 44b and 44c form a bearing for the spindle, and an O-ring 45 provides for the sealing. Fitted on the part of the spindle projecting out of the member 38 is a locking ring 46 as well as a fitting 47 for a turning knob (not shown). The part of the spindle projecting out of the slide 41 carries a locking ring 48, which forms the front abutment for the slide 41. The rear abutment is formed by the front edge of the thickened portion 44a of the spindle. A spring 49 ensures that the clearance is removed from the screw thread between the slide 41 and the spindle.

When the knob on 47 is rotated, the slide 41 is removed axially and thus the place of the right end of the expansion element is adjusted, in consequence of which the desired temperature has been set. The adjustability of the member 38 serves to bridge the summation of longitudinal tolerances. When the double-acting valve moves to the left, i.e. when the expansion element expands, in consequence of the fact that the mixture has a higher temperature than the temperature set, a smaller amount of hot water can enter the regulating device via 2, but the supply of the cold water is opened further via 3, in consequence of which the temperature of the mixture will decrease and the expansion element will contract, and as a result, a new condition of equilibrium is attained.

Due to the presence of the mixing cone 23, the mixing water flows towards an annular slot without obstructions. The vortices occuring in consequence of the presence of the openings 28 ensure thorough mixing of the hot and the cold water.

With the regulating device described above, it is possible to correct a temperature, once it has been set, within 3—2 seconds to within 1°C.

Although in FIG. 1, the expansion element has a tubular form of circular section, the expansion element may have cross sections of various forms, as shown in FIG. 2, provided the wall thickness over at least a part of the length does not exceed 2 mm. and the walls can come into sufficient contact with the medium throughout.

FIG. 2a shows the cross section of the expansion element used in the regulating device according to FIG. 1.

FIG. 2b shows a square cross section.

FIG. 2c shows an expansion element composed of intersecting strips.

FIG. 2d shows a round tube containing a cross of intersecting strips.

FIG. 2e shows a corrugated tube.

FIG. 2f shows a cross section consisting of a spirally wound sheet of synthetic material provided with a corrugated sheet of synthetic material connected therewith.

It will be obvious that other cross sections are also possible.

Furthermore, it will be obvious that the expansion element according to the invention can be used for regulating a variety of processes, including those which do not involve mixing. Nor is it necessary for the expansion element to be oblong. A variety of forms is possible for particular applications. The scope of the invention therefore is defined by the appended claims.

We claim:

1. A thermostatic combination tap for mixing hotter and colder fluid media, comprising at least one housing with supply connections for the hotter and colder media, at least one discharge connection for the mixture formed, a common regulating member which controls the ratio of the supply of the hotter and colder media, and a single temperature sensitive control member directly bathed with the fluid media and connected to adjust the regulating member, with the improvements comprising the temperature sensitive control member being formed by an expansion element with a length and a wall of thermoplastic material with a coefficient of thermal expansion of at least $1 \times 10^{-4}$ mm./°C., and a wall thickness at least over a portion of the length of not more than 2 mm., one end of the element being adjustably connected with the housing and the other end being connected with the regulating member to provide a control of the temperature within approximately 1°C. in approximately 20 seconds.

2. A thermostatic combination tap according to claim 1 further comprising a guide cone for conducting the hotter and colder fluid media through a narrow, annular, sharply delimited slot, substantially in the form of at least two concentric layers, the media behind the slot suddenly coming in a much larger flow passage, in consequence of which vortices occur and intensive mixing of the thin concentric layers of media takes place.

3. A thermostatic combination tap according to claim 1 wherein the expansion element is provided at least partially with two concentric tubes, in consequence of which two concentric flow paths are formed, a flexible guiding member being mounted in the flow path not containing the expansion element, the arrangement being such that, when small quantities flow through, the mixture flows substantially only through the flow path containing the expansion element.